Dec. 27, 1955  C. J. LUCIA  2,728,427
TRANSMISSIONS
Filed Nov. 28, 1951  3 Sheets-Sheet 1

FIG_1

Inventor
CARROLL J. LUCIA

Dec. 27, 1955   C. J. LUCIA   2,728,427
TRANSMISSIONS
Filed Nov. 28, 1951   3 Sheets-Sheet 2

FIG_2

FIG_3

Inventor
CARROLL J. LUCIA

Dec. 27, 1955   C. J. LUCIA   2,728,427
TRANSMISSIONS
Filed Nov. 28, 1951   3 Sheets-Sheet 3

FIG_4

FIG_5

FIG_6

FIG_7

INVENTOR.
CARROLL J. LUCIA
BY
Tibbetts & Wilson
ATTORNEYS

United States Patent Office 2,728,427  
Patented Dec. 27, 1955

2,728,427

TRANSMISSIONS

Carroll J. Lucia, Birmingham, Mich., assignor to Studebaker-Packard Corporation, a corporation of Michigan Application November 28, 1951, Serial No. 258,771

27 Claims. (Cl. 192—.033)

This invention relates to transmissions of the type having a high torque device such as a torque converter or a gear train for starting and accelerating a vehicle, and a lower torque, higher speed ratio drive such as a direct drive clutch for higher speed operation. More particularly the invention is directed to fluid pressure operated means for controlling the higher speed ratio drive as by controlling the engagement of the direct drive clutch by means responsive jointly to the speed of a driven shaft and to the position of the accelerator pedal.

In automatically operable transmissions having one torque ratio for accelerating a vehicle and having another torque ratio for higher speed operation, various arrangements have been employed to automatically control the transition from one torque ratio to another. Some of these arrangements have utilized the ratio of the speed or torque of an engine or a driving shaft with respect to the speed of the driven shaft to control the transition from one ratio to another.

More satisfactory results have been achieved by exerting fluid pressure proportionate to the speed of the driven shaft to shift a valve to engage the higher ratio drive, a fluid pressure proportionate to the position of the accelerator pedal controlling the engine being provided to oppose movement of the valve to the position to engage the higher ratio drive.

In the operation of such a shift control valve it is desirable, in order to prevent hunting or other erratic operation, to increase the force exerted on the valve after it has been moved to the position to engage the higher ratio drive as disclosed in the co-pending application of Forest R. McFarland, Serial No. 71,128 filed January 15, 1949, now Patent No. 2,694,948, dated November 23, 1954.

An object of this invention is to provide a simplified valve controlling a transmission to effect an automatic shift from one ratio to another.

A further object of the invention resides in the provision of an improved direct drive shift valve wherein a cylinder of uniform diameter throughout its length is utilized in conjunction with a piston operable when moved to a predetermined position to expose an inner chamber to pressure to increase the force urging the piston in a predetermined direction.

Another object of the invention is to provide an improved direct drive shift valve for a transmission wherein a plunger having an auxiliary piston slidably mounted therein is adapted to be moved in opposite directions by fluid pressure exerted on its opposite ends, fluid pressure being exerted on the auxiliary piston when moved to a predetermined position to maintain the plunger in an actuated position.

A further object is to provide a transmission control valve adapted to be moved toward an operating position by fluid pressure proportionate to the speed of a driven shaft, such movement of the valve being opposed by fluid pressure proportionate to the position of the accelerator pedal, and the valve being subjected to an auxiliary force exerted by the actuating fluid after the valve has been moved to an operating position to prevent undesired shifting of the valve between the clutch engaging and the clutch disengaging positions.

Yet another object of the invention is to provide a control for a transmission wherein opposite ends of a valve plunger are subjected to fluid pressures, one pressure being proportionate to the position of the accelerator pedal and the other pressure being proportionate to the speed of the driven shaft, the valve plunger having an auxiliary chamber subjected to fluid pressure proportionate to the position of the accelerator pedal or to fluid pressure proportionate to the speed of the driven shaft to prevent "hunting" or periodic oscillation of the valve plunger.

Still another object resides in the provision of a simplified clutch controlling valve that can be manufactured economically and which embodies improved operating characteristics.

Other objects and advantages of this invention will be apparent from the following detailed description, considered in connection with the accompanying drawings, wherein similar reference characters designate similar parts throughout the several views, and wherein.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
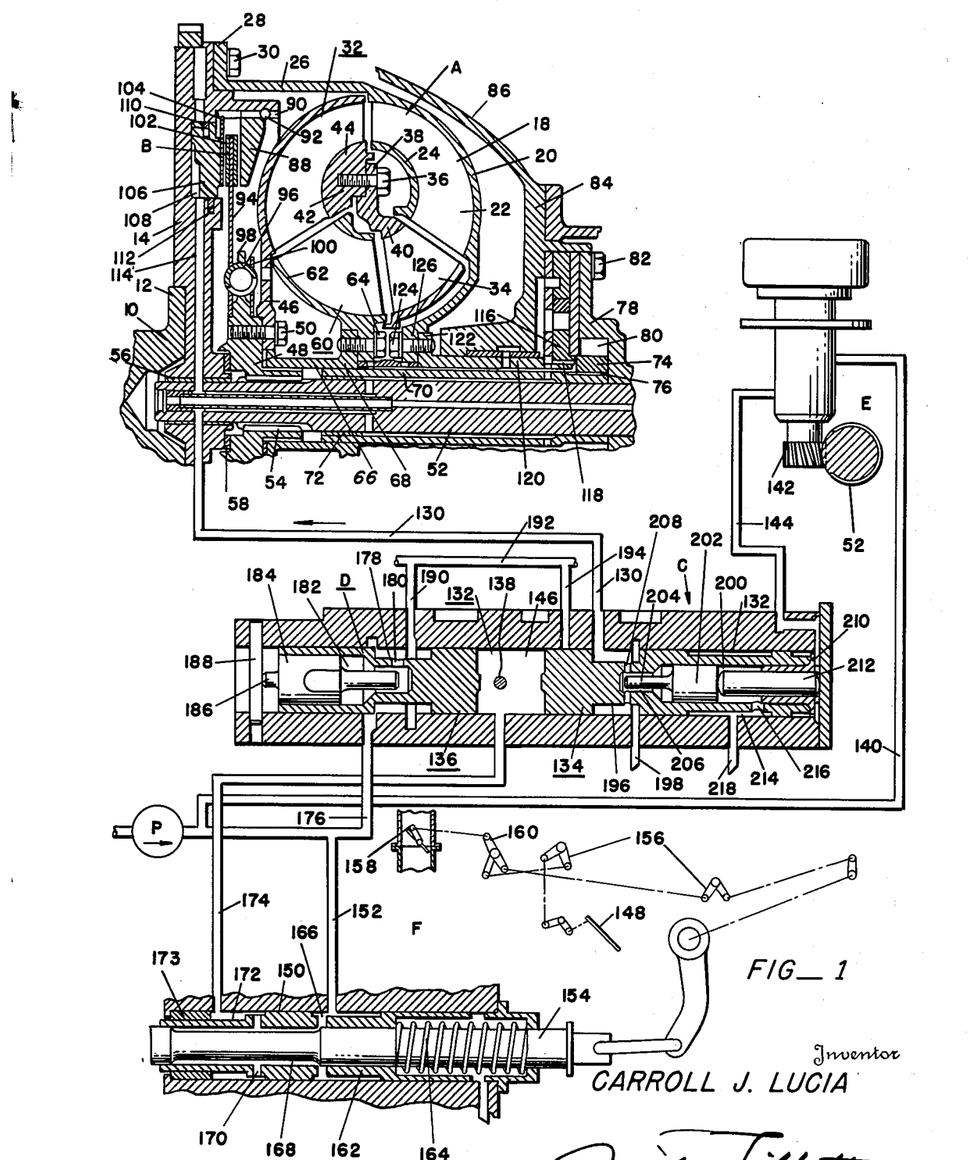
Fig. 1 is a diagrammatic sectional view illustrating a transmission embodying one form of my invention.

Referring now more particularly to Fig. 1 it will be noted that an engine crankshaft or driving shaft 10 is provided with a flange 12 which supports a flywheel 14 in the form of a disk secured thereto in any convenient manner as by screws.

A torque converter A is provided with a fluid energizing impeller 18, having an outer shell 20 including fluid deflecting vanes 22 interposed between the shell and an inner shroud 24. The outer shell 20 is provided with a cylindrical extension 26 terminating in a flange 28 adapted to be secured to the flywheel 14 as by screws 30. An energy absorbing turbine is associated with the impeller 18, and is provided with a first stage section 32 having an inlet adapted to be positioned adjacent the outlet from the impeller 18, and a second stage 34 adapted to be positioned adjacent the inlet to the impeller. The first and second stage turbine members 32 and 34 may be secured together in any suitable manner as by screws 36 projecting through a flange 38 carried by the inner shroud 40 of the second stage turbine 34 and extending into a boss 42 carried by the inner shroud 44 of the first stage turbine 32. It will of course be understood that the first and second stage turbine members may be secured together in any other convenient manner.

The first stage turbine 32 is preferably provided with an inwardly extending flange 46 adapted to be secured to a hub 48 as by screws 50. The hub 48 is secured to a driven shaft 52 in any convenient manner as by splines 54. The driven shaft 52 is axially aligned with the driving shaft 10, and is journalled for rotation in the flywheel 14 through a bushing 56, a thrust bearing 58 being interposed betwen the hub 48 and the flywheel 14.

The torque converter A is provided with a reaction member 60 preferably interposed between the first and second stage turbine members 32 and 34. The outer shell 62 of the reaction member is secured as by screws 64 to the flange of a hub 66 which in turn is secured as by welding 68 to a sleeve 70, the forward end of which is centrally positioned on the driven shaft 52 as by the bearing 72. A hub 74 secured to the rear end of the sleeve 70 as by splines 76 is connected to a stationary member 78 by a one-way brake 80. The stationary member 78 is secured as by screws 82 to the rear end 84 of a housing 86 surrounding the torque converter A as illustrated.

The reaction member 60 is restrained from rotating in the backward direction in the fluid circuit by the one-way brake 80 when backwardly directed forces are exerted thereon by the circulating fluid when the device is operating to transmit power with increased torque at reduced speed. The reaction member 60 and sleeve 70 rotate in the forward direction on the one-way brake 80 when the device is operating as a fluid coupling to transmit torque from the driving member 10 to the driven shaft 52 with no multiplication of torque.

A lower torque high speed ratio drive such as a mechanical clutch B is employed to provide a drive in parallel with the torque converter A. The clutch B is interposed between the driving member 10 and the driven shaft 52 to, in effect, interconnect the impeller and turbine members thereby interrupting the operation of the torque converter A or other high torque lower speed ratio drive and functions to transmit torque directly from the driving shaft 10 to the driven shaft 52 at a 1 to 1 speed ratio.

The mechanical clutch B includes a driving member 88 mounted through splines 90 in a cylindrical portion of the flywheel 14. The driving member 88 is restrained against rearward axial movement by a snap ring 92. The mechanical clutch B includes a disk 94 operably connected to the hub 48 through a resilient coupling such as a plurality of coiled springs 96 positioned in circumferentially extending slots formed between a flange 98 carried by the hub 48 and the disk 94, a disk 100 being secured to the disk 94 as by rivets, and having similarly disposed slots to balance the driving forces exerted on the springs 96.

The disk 94 may be provided with friction surfaces 102 adapted to be clutched to the driving member 88 and to an auxiliary driving disk 104 axially movable on the splines 90 of the cylindrical portion of the flywheel 14. A ring type piston 106 slidably mounted in a cylinder 108 is provided to move the disk 104 rearwardly to engage the clutch B positioned in parallel with the torque converter A.

When the clutch B is engaged torque is transmitted directly from the driving shaft 10 to the driven shaft 52 thereby mechanically interconnecting the impeller and turbine members 18 and 32 and rendering the torque converter A inoperable except as a flywheel. Radially expanding seals 110 and 112 carried by the piston 106, and the flywheel 14 are provided to prevent the escape of hydraulic fluid from the clutch engaging cylinder 108.

Fluid may be transmitted to the cylinder 108 to actuate the piston 106 through passages 114 in the flywheel 14 communicating through a series of interconnected passageways with a pressure gallery subjected to fluid pressure from a pump having an impeller 116 driven through splines 118 by a sleeve 120 having a flange 122 connected as by screws 124 to an inwardly directed flange 126 of the impeller web 20. It will of course be apparent that to permit the engine to be started by pushing the vehicle, a second pump may be driven by a driven shaft such as the shaft 52. These pumps may be connected to a common fluid pressure supply gallery if desired.

In an effort to simplify the disclosure of my invention, a source of fluid pressure is illustrated diagrammatically at P. It will of course be apparent that this source of fluid pressure may emanate from one or more pumps as stated above, and that it may be under constant pressure, or the pressure may vary in any desired manner as in accordance with variations of the speed or torque developed by the engine or in accordance with variations in the speed of a driven shaft or of the vehicle. In the example illustrated the source of fluid pressure P develops substantially constant pressure of the order of 80 to 90 p. s. i.

Also to simplify the illustration of my invention the cylinder 108 of the direct drive clutch B is illustrated diagrammatically as being connected through the passages 114 in the flywheel 14 and a conduit 130 with the cylinder 132 of a combined direct drive shift valve C and a modulating valve D.

The direct drive shift valve C and the modulating valve D have a common cylinder 132 of constant diameter. Manufacturing costs are thus minimized. The direct drive shift valve C and the modulating valve D have spaced plungers 134 and 136 respectively slidably mounted in the cylinder 132, a stop 138 extending across the cylinder 132 to limit movement of the plungers in opposite directions.

Figure 3:
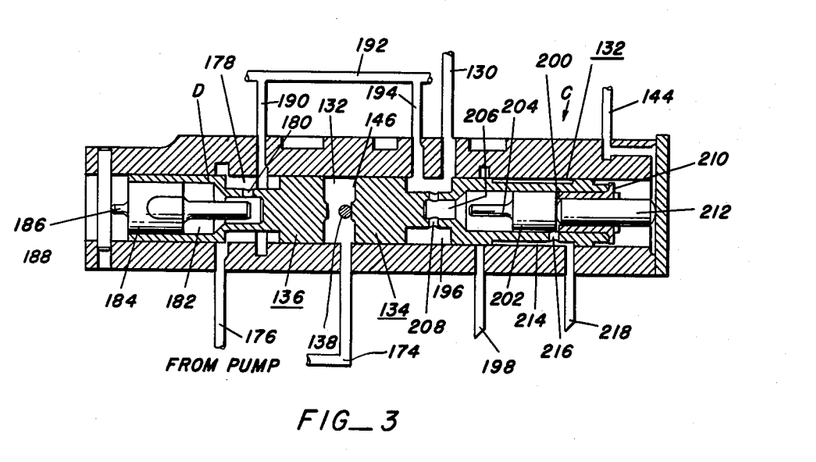
Fig. 3 is a view similar to Fig. 2 illustrating the control valves in an operated position.

The plunger 134 of the direct drive shift valve C is movable toward the left from a clutch disengaging position illustrated in Fig. 1 to a clutch engaging position illustrated in Fig. 3. Fluid pressure to urge the plunger 134 toward the clutch engaging position is provided by a governor E having a conduit 140 communicating with the source of fluid pressure P. The governor has a gear 142 driven by a driven shaft such as the shaft 52 to supply fluid pressure proportionate to vehicle speed through a conduit 144 to the right-hand end of the cylinder 132. In the example illustrated, the governor E is calibrated to deliver fluid pressure ranging from 31 to 61 p. s. i. to the plunger 134 of the direct drive shift valve C at vehicle speeds of 15 to 55 M. P. H. respectively.

Movement of the plunger 134 toward the direct drive position illustrated in Fig. 3 is opposed by fluid pressure exerted in a chamber 146 between the plungers 134 and 136 of the direct drive valve C and the modulating valve D. The pressure exerted in the chamber 146 emanates from an accelerator pedal actuated valve F, and is proportionate to the speed increasing position of an accelerator pedal 148. In the example illustrated this pressure ranges from approximately 26 to 58 p. s. i.

The accelerator pedal actuated valve F has a cylinder 150 communicating through a conduit 152 with the source of fluid pressure P. A plunger 154 slidably mounted in the cylinder 150 is connected through a linkage 156 with the accelerator pedal 148 which also actuates a throttle valve 158 through a linkage 160.

A sleeve 162 is slidably mounted on the plunger 154 and is yieldingly urged by a spring 164 toward the lefthand position to increase communication between fluid inlet ports 166 in the sleeve 162 and a section 168 of reduced diameter of the plunger 154 which communicates through ports 170 in the sleeve 162 with a section 172 of reduced diameter of the sleeve 162. An abutment in the form of a sleeve 173 is secured in the end of the cylinder 150. The section of reduced diameter 172 of the sleeve 162 is connected through a conduit 174 with the chamber 146 of the cylinder 132 between the direct drive shift valve C and the modulating valve D.

In the operation of the accelerator pedal actuated valve F it will be noted that as the accelerator pedal 148 is moved in the engine speed increasing direction the throttle valve 158 is moved in the clockwise direction and the plunger 154 is moved toward the right as viewed in Fig. 1 to increase the communication between the fluid inlet ports 166 and the section of reduced diameter 168 of the plunger 154. Fluid admitted from the pump P flows through the ports 170 to the section of reduced diameter 172 of the sleeve 162 and urges the sleeve to move toward the right in opposition to the spring 164 to reduce communication between the inlet conduit 152 and the section 168 of reduced diameter of the plunger 154. It will thus be apparent that for every position of the accelerator pedal 148 the valve F develops a proportionate fluid pressure and exerts it through the conduit 174 to the chamber 146 of the direct drive shift valve C and the modulating valve D.

Fluid pressure to actuate the direct drive clutch B is supplied by the modulating valve D, and is preferably proportionate to the speed increasing position of the accelerator pedal 148 but of a higher order than the pressure supplied by the accelerator pedal actuated valve F, such for example as ranging from 40 to 85 p. s. i. It will be noted that the source of fluid pressure P communicates through a conduit 176 with the cylinder 132 of the modulating valve D. The plunger 136 is provided with a section 178 of reduced diameter communicating through ports 180 with an elongated cylinder 182 formed in the plunger 136. A vent valve 184 having a projection 186 adapted to engage a stop member 188 in the cylinder 132 is slidably mounted in the plunger 136 to trap fluid in the cylinder 182, thereby exerting a force urging the plunger 136 toward the right in opposition to fluid pressure from the accelerator pedal actuated valve F exerted in the chamber 146. Since the pressure admitted to the cylindrical chamber 182 through the ports 180 emanates from the source of fluid pressure P and is therefore of a higher order than the pressure exerted in the chamber 146 from the accelerator pedal actuated valve F, the plunger 136 will be shifted to the right to reduce communication between the conduit 176 communicating with the source of fluid pressure P and the section of reduced diameter 178 of the plunger 136. A resultant pressure is thus maintained in the section 178 of reduced diameter which is proportionate to the speed increasing position of the accelerator pedal 148 but of a higher order than the pressure exerted in the chamber 146 from the accelerator pedal actuated valve F. This pressure is employed to actuate the direct drive clutch B and it is directed through the conduits 190, 192 and 194 to the cylinder 132 of the direct drive shift valve C adjacent the conduit 130 from the direct drive clutch B.

The plunger 134 of the direct drive shift valve C has a section 196 of reduced diameter proportioned in such a manner that when the plunger 134 is in the right-hand position as illustrated in Fig. 1 the conduit 130 from the direct drive clutch B communicates with a vent passage 198 in the cylinder 132 as illustrated to release the direct drive clutch.

The right-hand end of the plunger 134 has a cylindrical bore 200 which receives a piston 202 having an elongated nose 204 adapted to project into a section 206 of reduced diameter of the cylindrical bore 202 which communicates through ports 208 with the section 196 of reduced diameter of the plunger. The right-hand end of the plunger 134 is provided with a sleeve 210 fixed thereto and forming a guide for a spacer member 212. The plunger 134 is provided with a second section of reduced diameter 214 and a vent port 216 communicating with the cylindrical bore 200 between the piston 202 and the sleeve 210 to permit the escape of trapped fluid through a vent passage 218 in the cylinder 132.

The operation is as follows. With the engine running at idling speed the throttle valve 158 is maintained in the idling position whereupon relatively low fluid pressure of the order of 26 pounds per square inch is exerted in the chamber 146 of the direct drive shift valve C by the accelerator pedal actuated valve F. This pressure urges the plunger 134 of the direct drive shift valve C toward the right-hand position as illustrated in Fig. 1 to vent the direct drive clutch B through the conduit 130, the section of reduced diameter 196 of the plunger 134 and the vent passage 198.

As the engine is accelerated the impeller 18 of the torque converter energizes fluid and directs it to the turbine members 32 and 34 to drive the driven shaft 52, the reaction member 60 of the torque converter being locked against reverse rotation by the one-way clutch 80 to redirect the fluid to transmit power from the driving shaft 10 to the driven shaft 52 with an increase of torque.

At vehicle speeds between approximately 15 to 55 M. P. H. the governor E driven by a driven shaft such as the shaft 52 reduces fluid pressure from the source P, and directs progressively increasing pressure ranging from approximately 31 to 61 p. s. i. through the conduit 144 to urge the plunger 134 of the direct drive shift valve C toward the left-hand position in opposition to the pressure ranging from 26 to 58 p. s. i. exerted on the left-hand end of the plunger 134 in the chamber 146 from the accelerator actuated valve F. As the governor pressure overcomes the pressure from the accelerator pedal actuated valve, the plunger 134 including the piston 202, the sleeve 210 and the spacer member 212 are progressively shifted toward the left. When the plunger 134 shifts far enough to the left that the section of reduced diameter 196 communicates with the conduit 194 from the modulating valve D fluid ranging in pressure from 40 to 85 p. s. i. in the example illustrated is directed to the direct drive clutch B to engage it, and flows through the ports 208 and is exerted in the cylindrical bore 200 forwardly of the piston 202. The piston 202 and the spacer member 212 move rearwardly to the position illustrated in Fig. 3 whereupon modulated fluid pressure from the valve D is exerted between the forward end of the piston 202 and the rear surface of the cylindrical bore 200 thereby exerting an auxiliary force urging the plunger 134 toward the left-hand or clutch actuated position illustrated in Fig. 3. Erratic engagement and disengagement of the direct drive clutch B due to hunting or oscillating movement of the plunger 134 is thus prevented.

Attention is directed to the fact that the vehicle speed at which the direct drive clutch B will engage is dependent upon the position of the accelerator pedal and the speed of the driven shaft or the vehicle speed. For light throttle opening position of the accelerator pedal, the direct drive clutch B will engage at relatively slow vehicle speed, and for heavier positions of the accelerator pedal the engagement of the clutch will occur at higher vehicle speeds. It will also be apparent that the engagement of the clutch with the same throttle setting position of the accelerator pedal does not necessarily occur at the same vehicle speed because of the influence of the road conditions over which the vehicle is travelling, such for example as when going up or down hill.

It will be noted that the auxiliary force exerted by the modulated pressure is not exerted on the plunger 134 until after it has been shifted to the clutch engaging position by fluid pressure from the governor E.

Figure 2:
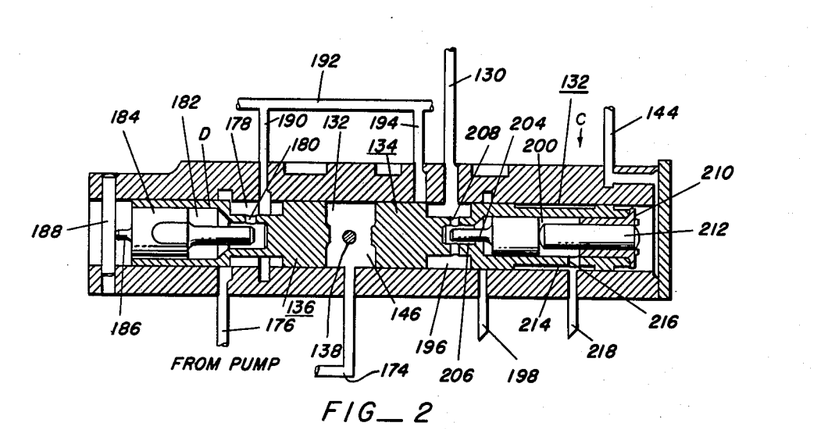
Fig. 2 is a fragmentary sectional view illustrating certain of the control valves in the position they occupy when moving from one operative position to another.

The embodiments of the invention illustrated in Figs. 4 to 7 are similar to that shown in Figs. 1 to 3 with the exception that the auxiliary chamber of the plunger 134 of the direct drive shift valve C is subjected to fluid pressure from the accelerator pedal actuated valve F or from the governor E rather than from modulating valve D which supplies the fluid under pressure which engages the clutch B.

Figure 4:
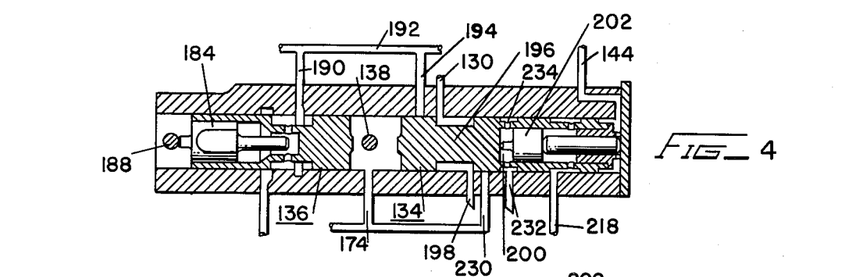
Figs. 4 and 5 are sectional views illustrating a modified form of the invention wherein fluid pressure from an accelerator pedal actuated valve F exerts an auxiliary force on the direct drive shift valve when it is moved to the position illustrated in Fig. 5.
Figure 5:
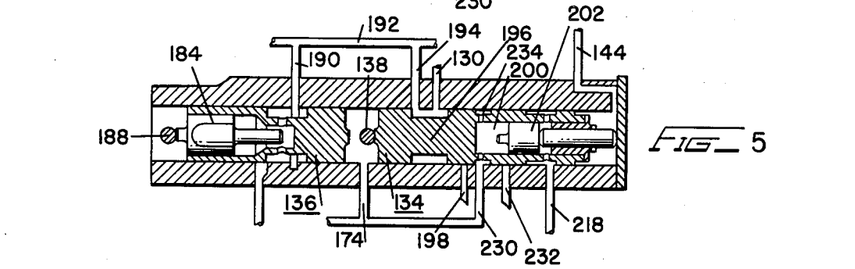

Referring to the embodiment of the invention illustrated in Figs. 4 and 5, it will be noted that the conduit 174 which interconnects the accelerator actuated valve F with the cylinder 132 between the modulating valve D and the direct drive shift valve C has an extension 230 adapted to communicate with the auxiliary chamber 200 in the plunger 134 when the plunger is shifted to the clutch engaging position illustrated in Fig. 5. As illustrated in Fig. 4, the section 196 of reduced diameter of the plunger 134 interconnects the conduit 130 leading to the cylinder 108 of the clutch B and the vent passage 198 when the plunger 134 is in the right-hand position thereby venting the actuating cylinder of the direct drive clutch B. When pressure from the governor E responsive to driven shaft or vehicle speed exerted on the right-hand end of the plunger 134 of the direct drive shift valve overcomes the pressure from the accelerator pedal actuated valve F exerted on the left-hand end of the plunger 134 of the direct drive shift valve, the plunger shifts to the left to the position shown in Fig. 5. The vent 198 is closed by the plunger 134 and the conduit 194 from the modulating valve D is uncovered by the section of reduced diameter 196. Fluid from the modulating valve D then flows through the conduits 194 and 130 to the actuating cylinder of the direct drive clutch B to engage it thereby relieving the torque converter or other high torque ratio driving means of the load whereupon the load is transmitted through the lower torque higher speed ratio clutch.

When the plunger 134 is in the clutch disengaged position illustrated in Figure 4, a vent passage 232 communicates with a cross-bore 234 in the plunger 134 to vent the auxiliary chamber 200 formed in the plunger 134 to the left of the auxiliary piston 202. When the plunger 134 is shifted to the left to the clutch actuating position, the cross bore 234 aligns with the conduit 230 from the accelerator actuated valve F whereupon the auxiliary chamber 200 in the plunger 134 is subjected to pressure from the accelerator actuated valve to shift the piston 202 toward the right as illustrated in Fig. 5 thereby exerting an auxiliary force on the plunger 134 urging it to the left to induce positive engagement of the clutch B or other friction device without any erratic operation thereof such as might be caused by a purely speed responsive device.

Figure 6:
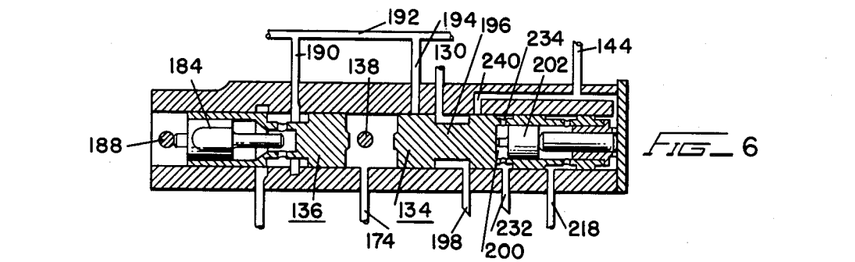
Figs. 6 and 7 are views similar to Figs. 4 and 5 wherein fluid pressure from a governor E exerts an auxiliary force on the direct drive shift valve when it is moved to the position illustrated in Fig. 7.
Figure 7:
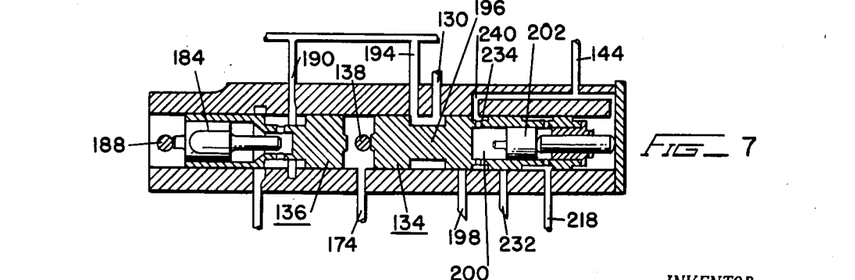

The embodiment of the invention illustrated in Figs. 6 and 7 is similar to that illustrated in Figs. 4 and 5 with the exception that a conduit 240 communicating with the conduit 144 from the governor E is employed to subject the auxiliary chamber 200 of the plunger 134 to fluid pressure from the governor when the plunger 134 of the direct drive shift valve is moved to the left to the clutch actuating position as illustrated in Fig. 7.

It will be noted that when the valve is in the clutch disengaged position illustrated in Fig. 6 the vent passage 232 aligns with the cross bore 234 in the plunger 134 to vent the auxiliary chamber 200 as illustrated. When the governor pressure overcomes the pressure from the accelerator actuated valve and shifts the valve to the clutch engaging position illustrated in Fig. 7, the vent 232 is closed by the plunger 134, and as the plunger 134 approaches the clutch engaging position illustrated in Fig. 7, the conduit 240 from the governor E communicates with the cross bore 234 in the plunger 134 to subject the auxiliary chamber 200 to governor pressure to subject the plunger to an increased force.

It will be noted that in all of the embodiments of the invention the plunger 134 of the direct drive shift valve C is actuated initially to engage the clutch when the force exerted on the right-hand end of the plunger 134 by the governor pressure overcomes the force exerted on the left-hand end of the plunger 134 by the accelerator actuated pressure. The plunger 134 is then shifted to the left to such a point that the reduced section 196 of the plunger communicates with the conduit 194 whereupon fluid from the modulating valve D flows to the actuating cylinder 108 to engage the clutch.

In the embodiment of Figs. 1 to 3, fluid from the modulating valve D flows through the cross bores 208 of the plunger 134 to the auxiliary chamber 200 of the plunger 134 on the left side of the auxiliary piston 202 to exert on the plunger 134 an auxiliary force in the same direction as the force exerted by the governor E to hold the plunger 134 in the engaging position illustrated in Fig. 3 to prevent erratic engagement of the clutch.

In the embodiment illustrated in Figs. 4 and 5 it will be noted that pressure from the accelerator actuated valve F exerts a force in the auxiliary chamber 200 of the plunger 134 when it is moved to the left to the engaging position illustrated in Fig. 5. The pressure thus exerted in the auxiliary chamber 200 of the plunger 134 from the accelerator actuated valve F exerts a force on the plunger 134 in the same direction as the governor pressure and in opposition to the pressure from the accelerator actuated valve and exerted on the left end of the plunger 134. It will thus be apparent that in this form of the invention, the pressure from the accelerator actuated valve F is exerted on the plunger 134 of the valve C at two spaced points, and that the resultant forces are in opposition to each other. The force exerted on the left-hand end of the plunger 134 provides the restraining force on the valve and is exerted on the plunger whenever pressure is supplied by the pump P which when applied to a motor vehicle is whenever the engine is running.

In the embodiment illustrated in Figs. 6 and 7 the force from the governor E is exerted on the right-hand end of the plunger 134 to shift it toward the clutch engaging position. When governor pressure overcomes the accelerator actuated pressure exerted on the left end of the plunger 134, the plunger shifts to the engaging position illustrated in Fig. 7, governor pressure is then exerted in the auxiliary chamber 200 of the plunger 134 to provide the desired additional force to hold the valve in the fully engaged position. It will be noted that in this embodiment of the invention, pressure from the governor is exerted on the plunger 134 at two spaced points when the plunger is moved to the actuating position illustrated in Fig. 7, and that these two forces act in the same direction.

It will be noted that in all of the forms of the invention illustrated the shift valve is subjected to two opposing forces. One of these forces is from the governor E, and is responsive to the speed of the vehicle. It exerts a force on the valve tending to shift it toward the position to engage the friction device. The other force is from the accelerator pedal and is a force resisting shifting of the valve toward the position to engage the friction device. When the governor pressure overcomes the accelerator pedal position pressure the valve is shifted toward the actuating position, and when the actuating position is reached an auxiliary force is exerted on the valve, and this force provides a "locking-in" effect for the valve which insures positive engagement of the clutch to prevent erratic engagement and disengagement or so-called "hunting" which would cause undesired clutch wear.

It will also be apparent that once the valve has shifted to the engaging position the friction device will remain engaged until a considerably slower speed is reached on deceleration than the speed at which the device was engaged when accelerating.

Attention is directed to the fact that manufacturing costs are minimized by the use of a valve structure having a constant diameter bore, thereby eliminating the necessity of maintaining a high degree of concentricity between adjacent cylindrical sections.

While the invention has been illustrated with reference to a particular embodiment it will be understood that various changes may be made without departing from the spirit of my invention.

This is a continuation-in-part of my earlier filed co-pending application Serial Number 148,023 filed March 7, 1950, now abandoned, and embodies the entire disclosure of said co-pending application.

I claim:

1. In a transmission having driving and driven shafts for an accelerator pedal controlled engine, a torque converter interconnecting said shafts, a direct drive clutch in parallel with the torque converter, a source of fluid pressure, fluid pressure operated means to engage the direct drive clutch, a direct drive shift valve controlling the engagement of the direct drive clutch and including an axially movable plunger having an auxiliary piston slidably mounted in a centrally disposed cylinder therein, means to restrain movement of the auxiliary piston in one direction, a governor operated valve controlling pressure fluid to exert on one end of the plunger of the direct drive shift valve a force proportionate to the speed of the driven shaft urging said plunger toward the direct drive clutch engaging position, an accelerator pedal actuated valve controlling pressure fluid that is adapted to exert on the opposite end of the plunger of the direct drive shift valve a force proportionate to the position of the accelerator pedal opposing movement of said plunger toward the clutch engaging position, and movement of the plunger of the direct drive shift valve to the clutch engaging position serving to establish fluid pressure flow circuits to exert clutch engaging fluid pressure in the centrally disposed cylinder to react against said auxiliary piston thereby exerting on the plunger of the direct drive shift valve an auxiliary force urging it toward the clutch engaging position.

2. In a control mechanism for a direct drive clutch between driving and driven shafts, a source of fluid pressure, fluid pressure operated means to engage said clutch, a valve controlling the engagement of said clutch and including a uniform diameter cylinder having fluid directing means communicating with said clutch engaging fluid pressure operated means and spaced fluid supply and fluid venting means associated with the fluid directing means, an axially movable plunger slidably mounted in said cylinder and movable from a clutch disengaging position interconnecting the fluid directing means and the fluid venting means to a clutch engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of said plunger to the clutch engaging position serving to establish fluid pressure flow circuits to exert clutch engaging fluid pressure in the centrally disposed cylinder to react against said auxiliary piston thereby exerting on said plunger an auxiliary force urging it toward the clutch engaging position.

3. In a transmission having driving and driven shafts for an accelerator pedal controlled engine, a torque increasing drive interconnecting said shafts, a direct drive clutch in parallel with the torque increasing drive, a source of fluid pressure, fluid pressure operated means to engage the direct drive clutch, a direct drive shift valve comprising a constant diameter cylinder including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of the plunger of the direct drive shift valve to the clutch engaging position serving to establish fluid pressure flow circuits to exert clutch engaging fluid pressure in the centrally disposed cylinder to react against said auxiliary piston thereby exerting on the plunger of the direct drive shift valve an auxiliary force urging it toward the clutch engaging position.

4. In a transmission having driving and driven shafts, a torque increasing drive interconnecting said shafts, a direct drive clutch in parallel with the torque increasing drive, a source of fluid pressure, fluid pressure operated means to engage the direct drive clutch, a direct drive shift valve including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, means to exert a force on one end of the plunger of the direct drive shift valve urging said plunger toward the clutch engaging position, means to exert on the opposite end of said plunger an opposing force, and movement of the plunger of the direct drive shift valve to the clutch engaging position serving to establish fluid pressure flow circuits to exert clutch engaging fluid pressure in the centrally disposed cylinder to react against said auxiliary piston thereby exerting on the plunger of the direct drive shift valve an auxiliary force urging it toward the clutch engaging position.

5. In a control mechanism for a direct drive clutch between driving and driven shafts, a source of fluid pressure, fluid pressure operated means to engage said clutch, a valve controlling the engagement of said clutch, an axially movable plunger slidably mounted in a cylinder of said valve and movable from a clutch disengaging position to a clutch engaging position, an auxiliary piston slidably mounted in a centrally disposed cylinder in said plunger, means to restrain movement of the auxiliary piston in one direction, means to exert a force on one end of the plunger of the direct drive shift valve, means to exert an opposing force on the opposite end of said plunger, and movement of said plunger to the clutch engaging position serving to establish fluid pressure flow circuits to exert clutch engaging fluid pressure in the centrally disposed cylinder to react against said auxiliary piston thereby exerting on said plunger an auxiliary force urging it toward the clutch engaging position.

6. In a transmission having driving and driven shafts for an accelerator pedal controlled engine, a high torque ratio drive interconnecting said shafts, a lower torque ratio drive including a clutch in parallel with the high torque ratio drive, a source of fluid pressure, fluid pressure operated means to engage said clutch, a valve controlling the engagement of said clutch and including an axially movable plunger having an auxiliary piston slidably mounted in a centrally disposed cylinder therein, means to restrain movement of the auxiliary piston in one direction, a governor operated valve controlling pressure fluid to exert on one end of the plunger of said valve a force proportionate to the speed of the driven shaft urging said plunger toward the clutch engaging position, an accelerator pedal actuated valve controlling pressure fluid that is adapted to exert on the opposite end of the plunger of said valve a force proportionate to the position of the accelerator pedal opposing movement of said plunger toward the clutch engaging position, and movement of the plunger of the direct drive shift valve to the clutch engaging position serving to establish fluid pressure flow circuits to exert fluid pressure in the centrally disposed cylinder to react against said auxiliary piston thereby exerting on the plunger of said valve an auxiliary force urging it toward the clutch engaging position.

7. In a control mechanism for a low torque ratio friction device between driving and driven shafts, a source of fluid pressure, fluid pressure operated means to engage said friction device, a valve controlling said fluid pressure operated means and including a uniform diameter cylinder having fluid directing means communicating with the fluid pressure operated means to engage said friction device and spaced fluid supply and fluid venting means associated with the fluid directing means, an axially movable plunger slidably mounted in said cylinder and movable from a disengaging position interconnecting the fluid directing means and the fluid venting means to an engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the engaging position, an accelerator pedal actuated valve controlling pressure fluid that is adapted to exert on the opposite end of said plunger an opposing force proportionate to the position of the accelerator pedal, and movement of said plunger to the engaging position serving to establish fluid pressure flow circuits to exert fluid pressure in the centrally disposed cylinder to react against said auxiliary piston thereby exerting on said plunger an auxiliary force urging it toward the clutch engaging position.

8. In a control mechanism for a friction device controlling a drive between driving and driven shafts, a source of fluid pressure, fluid pressure operated means to engage said friction device, a valve controlling the engagement of said friction device, an axially movable plunger slidably mounted in a cylinder of said valve and movable from a disengaging position to an engaging position, an auxiliary piston slidably mounted in a centrally disposed cylinder in said plunger, means to restrain movement of the auxiliary piston in one direction, means to exert a force on one end of the plunger of the direct drive shift valve, means to exert an opposing force on the opposite end of said plunger, and movement of said plunger to the engaging position serving to establish fluid pressure flow circuits to exert fluid pressure in the centrally disposed cylinder to react against said auxiliary piston thereby exerting on said plunger an auxiliary force urging it toward the engaging position.

9. In a transmission having driving and driven shafts for an accelerator pedal controlled engine, a high torque ratio drive interconnecting said shafts, a lower torque higher speed ratio drive in parallel with the high torque ratio drive, friction means controlling the lower torque ratio drive, a source of fluid pressure, fluid pressure operated means controlling said friction means, a valve controlling the fluid pressure operated means and including an axially shiftable plunger movable between positions to selectively disengage and engage said lower torque higher speed ratio drive, said plunger having an auxiliary piston slidably mounted in a centrally disposed cylinder therein, means to restrain movement of the auxiliary piston in one direction, a governor operated valve controlling pressure fluid to exert on one end of the plunger of said valve a force proportionate to the speed of the driven shaft urging said plunger toward the position to engage said lower torque higher speed ratio drive, an accelerator pedal actuated valve controlling pressure fluid that is adapted to exert on the opposite end of the plunger of said valve a force proportionate to the position of the accelerator pedal opposing movement of said plunger toward said engaging position, and movement of the plunger of the direct drive shift valve to said engaging position serving to establish fluid pressure flow circuits to exert clutch engaging fluid pressure in the centrally disposed cylinder to react against said auxiliary piston thereby exerting on the plunger of said valve an auxiliary force urging it toward said engaging position.

10. In a transmission having driving and driven shafts for an accelerator pedal controlled engine, a torque converter inter-connecting said shafts, a direct drive clutch in parallel with the torque converter, a source of fluid pressure, fluid pressure operated means to engage the direct drive clutch, a direct drive shift valve controlling the engagement of the direct drive clutch and including an axially movable plunger having an auxiliary piston slidably mounted in a centrally disposed cylinder therein, means to restrain movement of the auxiliary piston in one direction, a governor operated valve controlling pressure fluid to exert on one end of the plunger of the direct drive shift valve a force proportionate to the speed of the driven shaft urging said plunger toward the direct drive clutch engaging position, an accelerator pedal actuated valve controlling pressure fluid that is adapted to exert on the opposite end of the plunger of the direct drive shift valve a force proportionate to the position of the accelerator pedal opposing movement of said plunger toward the clutch engaging position, and movement of the plunger of the direct drive shift valve to the clutch engaging position serving to establish fluid pressure flow circuits to exert in the centrally disposed cylinder fluid pressure from the accelerator pedal actuated valve to react against said auxiliary piston thereby exerting on the plunger of the direct drive shift valve an auxiliary force urging it toward the clutch engaging position.

11. In a control mechanism for a direct drive clutch between driving and driven shafts, a source of fluid pressure, fluid pressure operated means to engage said clutch, a valve controlling the engagement of said clutch and including a uniform diameter cylinder having fluid directing means communicating with said clutch engaging fluid pressure operated means and spaced fluid supply and fluid venting means associated with the fluid directing means, an axially movable plunger slidably mounted in said cylinder and movable from a clutch disengaging position interconnecting the fluid directing means and the fluid venting means to a clutch engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of said plunger to the clutch engaging position serving to establish fluid pressure flow circuits to exert in the centrally disposed cylinder fluid pressure from the accelerator pedal actuated valve to react against said auxiliary piston thereby exerting on said plunger an auxiliary force urging it toward the clutch engaging position.

12. In a transmission having driving and driven shafts for an accelerator pedal controlled engine, a torque increasing drive inter-connecting said shafts, a direct drive clutch in parallel with the torque increasing drive, a source of fluid pressure, fluid pressure operated means to engage the direct drive clutch, a direct drive shift valve comprising a constant diameter cylinder including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of the plunger of the direct drive shift valve to the clutch engaging position serving to establish fluid pressure flow circuits to exert in the centrally disposed cylinder fluid pressure from the accelerator pedal actuated valve to react against said auxiliary piston thereby exerting on the plunger of the direct drive shift valve an auxiliary force urging it toward the clutch engaging position.

13. In a control mechanism for a high speed ratio friction device between driving and driven shafts, a source of fluid pressure, fluid pressure operated means to engage said friction device, a valve controlling said fluid pressure operated means and including a uniform diameter cylinder having fluid directing means communicating with the fluid pressure operated means to engage said friction device and spaced fluid supply and fluid venting means associated with the fluid directing means, an axially movable plunger slidably mounted in said cylinder and movable from a disengaging position interconnecting the fluid directing means and the fluid venting means to an engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the engaging position, an accelerator pedal actuated valve controlling pressure fluid that is adapted to exert on the opposite end of said plunger an opposing force proportionate to the position of the accelerator pedal, and movement of said plunger to the engaging position serving to establish fluid pressure flow circuits to exert in the centrally disposed cylinder fluid pressure from the accelerator pedal actuated valve to react against said auxiliary piston thereby exerting on said plunger an auxiliary force urging it toward the clutch engaging position.

14. In a transmission having driving and driven shafts for an accelerator pedal controlled engine, a high torque ratio drive interconnecting said shafts, a lower torque higher speed ratio drive in parallel with the high torque ratio drive, friction means controlling the lower torque ratio drive, a source of fluid pressure, fluid pressure operated means controlling said friction means, a valve controlling the fluid pressure operated means and including an axially shiftable plunger movable between positions to selectively disengage and engage said lower torque higher speed ratio drive, said plunger having an auxiliary chamber therein, means to restrain movement of the auxiliary piston in one direction, a governor operated valve controlling pressure fluid to exert on one end of the plunger of said valve a force proportionate to the speed of the driven shaft urging said plunger toward the position to engage said lower torque higher speed ratio drive, an accelerator pedal actuated valve controlling pressure fluid that is adapted to exert on the opposite end of the plunger of said valve a force proportionate to the position of the accelerator pedal opposing movement of said plunger toward said engaging position, and movement of the plunger of the direct drive shift valve to said engaging position serving to establish fluid pressure flow circuits to exert in the auxiliary chamber fluid pressure from the accelerator pedal actuated valve to exert on the plunger of said valve an auxiliary force urging it toward said engaging position.

15. In a transmission having driving and driven shafts for an accelerator pedal controlled engine, a torque converter interconnecting said shafts, a direct drive clutch in parallel with the torque converter, a source of fluid pressure, fluid pressure operated means to engage the direct drive clutch, a direct drive shift valve controlling the engagement of the direct drive clutch and including an axially movable plunger having an auxiliary piston slidably mounted in a centrally disposed cylinder therein, means to restrain movement of the auxiliary piston in one direction, a governor operated valve controlling pressure fluid to exert on one end of the plunger of the direct drive shift valve a force proportionate to the speed of the driven shaft urging said plunger toward the direct drive clutch engaging position, an accelerator pedal actuated valve controlling pressure fluid that is adapted to exert on the opposite end of the plunger of the direct drive shift valve a force proportionate to the position of the accelerator pedal opposing movement of said plunger toward the clutch engaging position, and movement of the plunger of the direct drive shift valve to the clutch engaging position serving to establish fluid pressure flow circuits to exert fluid pressure proportionate to the speed of the driven shaft in the centrally disposed cylinder to react against said auxiliary piston thereby exerting on the plunger of the direct drive shift valve an auxiliary force urging it toward the clutch engaging position.

16. In a control mechanism for a direct drive clutch between driving and driven shafts, a source of fluid pressure, fluid pressure operated means to engage said clutch, a valve controlling the engagement of said clutch and including a uniform diameter cylinder having fluid directing means communicating with said clutch engaging fluid pressure operated means and spaced fluid supply and fluid venting means associated with the fluid directing means, an axially movable plunger slidably mounted in said cylinder and movable from a clutch disengaging position interconnecting the fluid directing means and the fluid venting means to a clutch engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of said plunger to the clutch engaging position serving to establish fluid pressure flow circuits to exert fluid pressure proportionate to the speed of the driven shaft in the centrally disposed cylinder to react against said auxiliary piston thereby exerting on said plunger an auxiliary force urging it toward the clutch engaging position.

17. In a transmission having driving and driven shafts for an accelerator pedal controlled engine, a torque increasing drive interconnecting said shafts, a direct drive clutch in parallel with the torque increasing drive, a source of fluid pressure, fluid pressure operated means to engage the direct drive clutch, a direct drive shift valve comprising a constant diameter cylinder including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, a governor operated valve controlling pressure fluid to exert on one end of the plunger of the direct drive shift valve a force proportionate to the speed of the driven shaft urging said plunger toward the clutch engaging position, an accelerator pedal actuated valve controlling pressure fluid that is adapted to exert on the opposite end of said plunger an opposing force proportionate to the position of the accelerator pedal, and movement of the plunger of the direct drive shift valve to the clutch engaging position serving to establish fluid pressure flow circuits to exert in the centrally disposed cylinder a force proportionate to the speed of the driven shaft to react against said auxiliary piston thereby exerting on the plunger of the direct drive shift valve an auxiliary force urging it toward the clutch engaging position.

18. In a control mechanism for a low torque ratio friction device between driving and driven shafts, a source of fluid pressure, fluid pressure operated means to engage said friction device, a valve controlling said fluid pressure operated means and including a uniform diameter cylinder having fluid directing means communicating with the fluid pressure operated means to engage said friction device and spaced fluid supply and fluid venting means associated with the fluid directing means, an axially movable plunger slidably mounted in said cylinder and movable from a disengaging position interconnecting the fluid directing means and the fluid venting means to an engaging position interconnecting the fluid directing means and the fluid supply means, an auxiliary piston slidably mounted in a centrally disposed cylinder in said plunger, means to restrain movement of the auxiliary piston in one direction, a governor operated valve controlling pressure fluid to exert on one end of the plunger of the direct drive shift valve a force proportionate to the speed of the driven shaft urging said plunger toward the engaging position, an accelerator pedal actuated valve controlling pressure fluid that is adapted to exert on the opposite end of said plunger an opposing force proportionate to the position of the accelerator pedal, and movement of said plunger to the engaging position serving to establish fluid pressure flow circuits to exert in the centrally disposed cylinder fluid pressure from the governor to react against said auxiliary piston thereby exerting on said plunger an auxiliary force urging it toward the clutch engaging position.

19. In a transmission having driving and driven shafts for an accelerator pedal controlled engine, a high torque ratio drive interconnecting said shafts, a lower torque higher speed ratio drive in parallel with the high torque ratio drive, friction means controlling the lower torque ratio drive, a source of fluid pressure, fluid pressure operated means controlling said friction means, a valve controlling the fluid pressure operated means and including an axially shiftable plunger movable between positions to selectively disengage and engage said lower torque higher speed ratio drive, said plunger having an auxiliary chamber therein, an auxiliary piston in said chamber means to restrain movement of the auxiliary piston in one direction, a governor operated valve controlling pressure fluid to exert on one end of the plunger of said valve a force proportionate to the speed of the driven shaft urging said plunger toward the position to engage said lower torque higher speed ratio drive, an accelerator pedal actuated valve controlling pressure fluid that is adapted to exert on the opposite end of the plunger of said valve a force proportionate to the position of the accelerator pedal opposing movement of said plunger toward said engaging position, and movement of the plunger of the direct drive shift valve to said engaging position serving to establish fluid pressure flow circuits to exert in the auxiliary chamber fluid pressure from the governor to exert on the plunger of said valve an auxiliary force urging it toward said engaging position.

20. In a control mechanism for a friction device controlling a drive between driving and driven shafts, a source of fluid pressure, fluid pressure operated means to engage said friction device, a valve controlling the engagement of said friction device, an axially movable plunger slidably mounted in a cylinder of said valve and movable from a disengaging position to an engaging position, an auxiliary piston slidably mounted in an auxiliary chamber in said plunger, means to restrain movement of the auxiliary piston in one direction, means to exert a force on one end of the plunger of the direct drive shift valve, means to exert an opposing force on the opposite end of said plunger, and movement of said plunger to the engaging position serving to establish fluid pressure flow circuits to exert a force in the auxiliary chamber thereby exerting on said plunger an auxiliary force urging it toward the engaging position.

21. In a transmission having driving and driven shafts, a torque increasing drive interconnecting said shafts, a clutch in parallel with the torque increasing drive, a source of fluid pressure, fluid pressure operated means to engage the clutch, a shift valve including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, means to exert a force on one end of the plunger of the shift valve urging said plunger toward the clutch engaging position, means to exert on the opposite end of said plunger an opposing force, and movement of the plunger of the shift valve to the clutch engaging position serving to establish fluid pressure flow circuits to exert fluid pressure in the centrally disposed cylinder to react against said auxiliary piston thereby exerting on the plunger of the shift valve an auxiliary force urging it toward the clutch engaging position.

22. In a transmission having driving and driven shafts, an accelerator influencing the torque exerted on the driving shaft, a high torque ratio drive interconnecting said shafts, a lower torque higher speed ratio drive in parallel with the high torque ratio drive, friction means controlling the lower torque ratio drive, a source of fluid pressure, fluid pressure operated means controlling said friction means, a valve controlling the fluid pressure operated means and including a plunger movable between positions to selectively disengage and engage said lower torque higher speed ratio drive, said plunger having an auxiliary chamber, a piston restrained against movement in one direction in said chamber, means to exert on one end of the plunger of said valve a force proportionate to the speed of the driven shaft urging said plunger toward one operative position, means to exert on the opposite end of the plunger of said valve a force proportionate to the position of the accelerator opposing movement of said plunger toward said operative position, and movement of said plunger of the direct drive shift valve to said operative position serving to establish fluid pressure flow circuits to exert a force in the auxiliary chamber tending to drive said plunger toward said operative position and drive said piston in said one direction.

23. In a control mechanism for a clutch between driving and driven shafts, a source of fluid pressure, fluid pressure operated means to engage said clutch, a valve controlling the engagement of said clutch, an axially movable plunger slidably mounted in a cylinder of said valve and movable from a clutch disengaging position to a clutch engaging position, an auxiliary piston slidably mounted in a centrally disposed cylinder in said plunger, means to restrain movement of the auxiliary piston in one direction, means to exert a force on one end of the plunger of the shift valve, means to exert an opposing force on the opposite end of said plunger, and movement of said plunger to the clutch engaging position serving to establish fluid pressure flow circuits to exert fluid pressure in the centrally disposed cylinder to react against said auxiliary piston thereby exerting on said plunger an auxiliary force urging it toward the clutch engaging position.

24. In a transmission having driving and driven shafts, a torque increasing drive interconnecting said shafts, a direct drive clutch in parallel with the torque increasing drive, a source of fluid pressure, fluid pressure operated means to engage the direct drive clutch, a direct drive shift valve including an axially movable plunger shiftable from a clutch disengaging position to a clutch engaging position and having an auxiliary piston slidably mounted in a centrally disposed axially extending cylinder formed therein, means to restrain movement of the auxiliary piston in one direction, means to exert a force on one end of the plunger of the direct drive shift valve urging said plunger toward the clutch engaging position, means to exert on the opposite end of said plunger an opposing force, and movement of the plunger of the direct drive shift valve to the clutch engaging position serving to establish fluid pressure flow circuits to exert in the centrally disposed cylinder a force from one of said force exerting means to react against said auxiliary piston thereby exerting on the plunger of the direct drive shift valve an auxiliary force urging it toward the clutch engaging position.

25. In a control mechanism for a direct drive clutch between driving and driven shafts, a source of fluid pressure, fluid pressure operated means to engage said clutch, a valve controlling the engagement of said clutch, an axially movable plunger slidably mounted in a cylinder of said valve and movable from a clutch disengaging position to a clutch engaging position, an auxiliary piston slidably mounted in a centrally disposed cylinder in said plunger, means to restrain movement of the auxiliary piston in one direction, means to exert a force on one end of the plunger of the direct drive shift valve, means to exert an opposing force on the opposite end of said plunger, and movement of said plunger to the clutch engaging position serving to establish fluid pressure flow circuits to exert in the centrally disposed cylinder a force from one of said force exerting means to react against said auxiliary piston thereby exerting on said plunger an auxiliary force urging it toward the clutch engaging position.

26. In a control mechanism for a friction device controlling a drive between driving and driven shafts, a source of fluid pressure, fluid pressure operated means to engage said friction device, a valve controlling the engagement of said friction device, an axially movable plunger slidably mounted in a cylinder of said valve and movable from a disengaging position to an engaging position, an auxiliary piston slidably mounted in a centrally disposed cylinder in said plunger, means to restrain movement of the auxiliary piston in one direction, means to exert a force on one end of the plunger of the direct drive shift valve, means to exert an opposing force on the opposite end of said plunger, and movement of said plunger to the engaging position serving to establish fluid pressure flow circuits to exert in the centrally disposed cylinder a force from one of said force exerting means to react against said auxiliary piston thereby exerting on said plunger an auxiliary force urging it toward the engaging position.

27. A shift valve for a transmission comprising a member having a cylinder therein, a plunger movable from one extreme position to another in the cylinder and having an auxiliary piston slidably mounted in an auxiliary chamber therein, means to restrain movement of the auxiliary piston in one direction, the plunger having a section of reduced diameter and a radially extended port communicating with the auxiliary chamber between the plunger and the auxiliary piston, the member defining the cylinder having a port communicating with a device to be actuated and adapted to align with the section of reduced diameter of the plunger, said cylinder defining member having ports spaced with reference to the port communicating with the device to be actuated that when the plunger is in one extreme position the device to be actuated is connected to a source of fluid pressure and when the plunger is in another extreme position the device to be actuated is vented, the radially extended port in the plunger communicating with the auxiliary chamber and subjecting said chamber to fluid pressure when the plunger is in the position to connect the device to be actuated with the source of fluid pressure and to vent said chamber when the plunger is in the position to vent the device to be actuated.

References Cited in the file of this patent

UNITED STATES PATENTS

| | | |
|---|---|---|
| 2,102,781 | Bieretz | Dec. 21, 1937 |
| 2,516,203 | Greenlee et al. | July 25, 1950 |
| 2,516,208 | Hasbany | July 25, 1950 |
| 2,523,726 | Seeger | Sept. 26, 1950 |
| 2,604,197 | Livermore | July 22, 1952 |
| 2,606,456 | Dodge | Aug. 12, 1952 |